June 3, 1930.    J. L. DRAKE    1,761,199
SHEET GLASS HANDLING APPARATUS
Filed Sept. 18, 1926
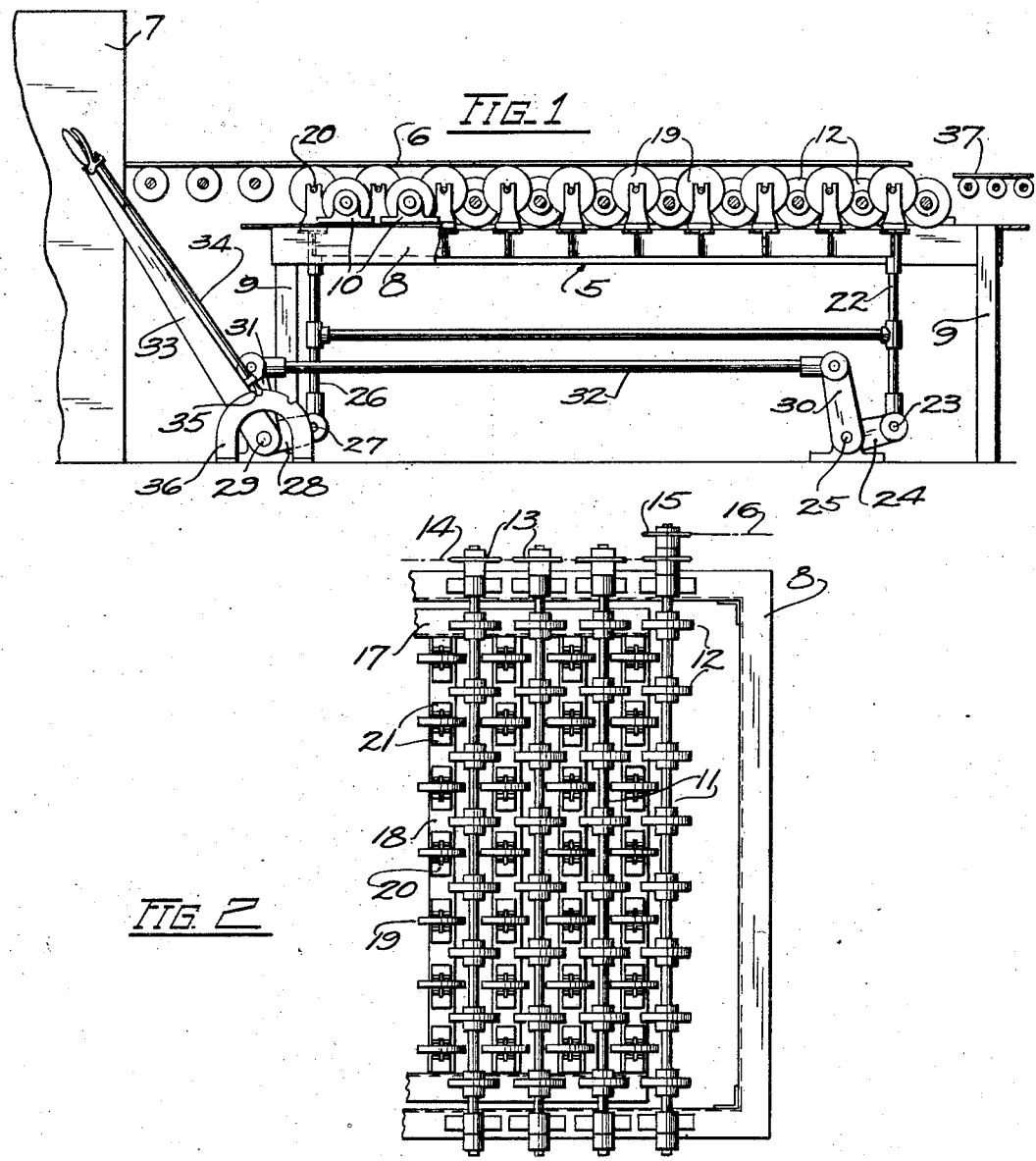
Inventor
John L. Drake
By Frank Fraser,
Attorney Patented June 3, 1930

1,761,199

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

SHEET-GLASS-HANDLING APPARATUS

Application filed September 18, 1926. Serial No. 136,240.

This invention relates to new and useful improvements in apparatus for handling and carrying glass sheets.

An important object of the invention is the provision of apparatus of the above character for receiving and supporting a ribbon of glass as it emerges from an annealing leer.

Another object of the invention is to provide improved apparatus of the above character for quickly carrying away the glass as it is cut into sheet form.

Another object of the invention is to provide improved apparatus of the above character for carrying away the sheets of glass after they have been cut from the ribbon at a speed relatively greater than the movement of said ribbon and in the same direction as the travel thereof.

Another object of the invention is to provide improved apparatus of the above character for supporting the ribbon as it emerges from the leer, and for carrying away the sheets after they are cut from the ribbon at a speed relatively greater than the movement of said ribbon.

A further object of the invention is to provide improved apparatus of the above character including a plurality of rollers for supporting the glass ribbon, a plurality of rollers rotatable in the same direction as the supporting rollers for carrying away the sheets after they have been cut from the ribbon at a speed relatively greater than the movement of the ribbon, together with means for moving said supporting rollers relative to said carrying rollers whereby to bring the glass sheets into engagement with the latter after said sheets have been cut.

Other objects and advantages of the invention will become more apparent during the course of the following description when taken in connection with the accompanying drawings.

In the drawings wherein like numerals are employed to designate like parts throughout the same, Fig. 1 is a side elevation, partially in section, of improved apparatus constructed in accordance with the present invention, and Fig. 2 is a top plan view of a portion thereof.

Referring now more in detail to the accompanying drawings, the numeral 5 designates in its entirety improved apparatus constructed in accordance with the present invention for receiving and supporting the ribbon of glass 6 as it emerges from the annealing leer 7, and for quickly carrying away the glass after it has been cut into sheet form.

The improved apparatus 5 for handling and carrying the glass is positioned adjacent the leer 7, as shown, and embodies in its construction an open, substantially rectangular frame 8, supported upon suitable standards or legs 9. Extending transversely of the frame 8, and journaled within bearings 10, is a plurality of spaced parallel shafts 11 upon which are keyed a plurality of spaced rollers 12, the rollers on the different shafts being in longitudinal alignment with one another.

The shafts 11 extend beyond the frame 8 at one side thereof and have keyed thereto sprockets 13, about which is trained a sprocket chain 14. One of the shafts 11, and preferably an end shaft, has also keyed thereto a second sprocket 15 about which is trained a sprocket chain 16, said chain 16 being connected with any suitable type of motor or other driving means, not shown. Thus, upon operation of the driving means, the shafts 11 will be caused to simultaneously rotate in the same direction.

Arranged within the stationary frame 8, beneath the shafts 11, is an open, substantially rectangular movable frame 17 provided with a plurality of spaced parallel cross bars 18 which are positioned between and substantially parallel with the shafts 11. Carried by each of the cross bars 18 is a plurality of idler rollers 19, each roller being provided upon opposite side faces with trunnions 20 which are received within notches formed in the upper edges of spaced bearings 21 between which the said rollers are received. It will be noted that the rollers 19 are arranged between the rollers 12, or in staggered relation relative thereto, and are positioned to rotate in the same direction therewith.

In order to raise and lower the movable frame 17 and the rollers 19, there are secured to the forward end of the frame 17 at opposite sides thereof depending rods 22 pivoted at their lower ends as at 23 to links 24, which are in turn keyed to a shaft 25 extending transversely of the frame. Secured to and depending from the opposite end of the frame 17 at opposite sides thereof are rods 26 pivoted at their lower ends as at 27 to links 28, which are in turn keyed to a shaft 29 extending transversely of the frame. Keyed to the shafts 25 and 29 at opposite ends thereof are links 30 and 31 connected by means of horizontal connecting rods 32.

Also keyed to the shaft 29 is an operating handle 33 carrying a lever 34 provided at its lower end with a pawl 35 adapted to engage within notches formed in the rack segment 36.

In the operation of the present invention, the movable frame 17 is normally held in elevated position, as shown in Fig. 1, so that the idler rollers 19 will be positioned above the driven rollers 12 to receive the glass ribbon 6 as it emerges from the leer 7. At predetermined intervals, the ribbon is adapted to be cut transversely into sheet form, and as soon as the ribbon is thus cut the pawl 35 is disengaged from the rack segment 36 and the handle 33 is swung to the right in order to lower the movable frame 17 and idler rollers 19. As the rollers 19 are lowered, the sheet is brought into engagement with the driven rollers 12, whereupon these rollers will act to quickly carry away the sheet at a speed relatively greater than the movement of the ribbon and in the same direction as the travel thereof. After the sheet 37 is clear of the driven rollers, as shown in Fig. 1, the operating handle 33 is swung to the left to again raise the movable frame 17 to position the idler rollers 19 so that they will again receive the ribbon emerging from the leer.

The provision of the present improved means for quickly carrying away the glass sheet after it has been cut from the ribbon at a speed relatively greater than the movement of the ribbon, contains certain advantages, one being that if the sheet were not carried away after being cut from the ribbon at a speed relatively greater than the movement of said ribbon, the adjacent edges of the sheet and ribbon would rub or work against one another which might result in the cracking of the sheet or ribbon or the marring of the edges thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass handling apparatus, means for supporting a moving ribbon of glass, means for carrying away a sheet after it has been cut from the ribbon at a speed relatively greater than the movement of said ribbon and in the same direction as the travel thereof, and means for moving said supporting means to bring the sheet into engagement with said carrying means.

2. In sheet glass handling apparatus, vertically movable means for supporting a moving ribbon of glass, fixed means for carrying away a sheet after it has been cut from the ribbon at a speed relatively greater than the movement of said ribbon and in the same direction as the travel thereof, and means for moving the supporting means vertically for bringing said sheet into engagement with the carrying means.

3. In sheet glass handling apparatus, movable means for supporting a moving ribbon of glass, fixed means normally positioned beneath said supporting means for carrying away a sheet after it has been cut from the ribbon at a speed relatively greater than the movement of said ribbon and in the same direction as the travel thereof, and means for lowering said supporting means to bring the sheet into engagement with the carrying means.

4. In sheet glass handling apparatus, means for supporting a moving ribbon of glass, means for carrying away a sheet after it has been cut from the ribbon at a speed relatively greater than the movement of said ribbon and in the same direction as the travel thereof, and means for raising and lowering said supporting means relative to said carrying means.

5. In sheet glass handling apparatus, a plurality of rollers for supporting a moving ribbon of glass, and a plurality of rollers rotatable in the same direction as the supporting rollers for carrying away a sheet of glass after it has been cut from the ribbon at a speed relatively greater than the movement of said ribbon.

6. In sheet glass handling apparatus, a plurality of rollers for supporting a moving ribbon of glass, a plurality of rollers rotatable in the same direction as the supporting rollers for carrying away a sheet of glass after it has been cut from the ribbon at a speed relatively greater than the movement of said ribbon, and means for moving the said supporting rollers to bring the sheet into engagement with said carrying rollers.

7. In sheet glass handling apparatus, a plurality of idler rollers for supporting a moving ribbon of glass, and a plurality of driven rollers rotatable in the same direction as the idler rollers for carrying away a sheet of glass after it has been cut from the ribbon at a speed relatively greater than the movement of said ribbon.

8. In sheet glass handling apparatus, a plurality of idler rollers for supporting a moving ribbon of glass, and a plurality of driven rollers normally positioned beneath said supporting rollers and rotatable in the same direction therewith for carrying away a sheet after it has been cut from the ribbon at a speed relatively greater than the movement of said ribbon and in the same direction as the travel thereof.

9. In sheet glass handling apparatus, a plurality of vertically movable idler rollers for supporting a moving ribbon of glass, and a plurality of fixed driven rollers normally positioned beneath said supporting rollers and rotatable in the same direction therewith for carrying away a sheet of glass after it has been cut from the ribbon at a speed relatively greater than the movement of the ribbon and in the same direction as the travel thereof.

10. In sheet glass handling apparatus, a plurality of vertically movable idler rollers for supporting a moving ribbon of glass, a plurality of fixed driven rollers normally positioned beneath said supporting rollers and rotatable in the same direction therewith for carrying away a sheet of glass after it has been cut from the ribbon at a speed relatively greater than the movement of the ribbon and in the same direction as the travel thereof, and means for raising and lowering said supporting rollers relative to said carrying rollers.

Signed at Toledo, in the county of Lucas and State of Ohio, this 15th day of September 1926.

JOHN L. DRAKE.